(12) United States Patent
Kummle

(10) Patent No.: US 8,123,177 B2
(45) Date of Patent: Feb. 28, 2012

(54) INPUT SYSTEM FOR A LANDING FLAP CONTROL OF AN AIRCRAFT

(75) Inventor: Wolfgang Kummle, Salem/Beuren (DE)

(73) Assignee: Diehl Aerospace GmbH, Uberlingen (DE)

( * ) Notice: Subject to any disclaimer, the term of this patent is extended or adjusted under 35 U.S.C. 154(b) by 385 days.

(21) Appl. No.: 12/427,010

(22) Filed: Apr. 21, 2009

(65) Prior Publication Data

US 2010/0078525 A1    Apr. 1, 2010

(51) Int. Cl.
*B64C 13/00* (2006.01)
*B64C 13/50* (2006.01)

(52) U.S. Cl. .................. 244/236; 244/76 A; 244/99.2

(58) Field of Classification Search ............... 244/75.1, 244/76 A, 87, 88, 89, 90 R, 90 A, 220, 221, 244/236
See application file for complete search history.

(56) References Cited

U.S. PATENT DOCUMENTS

| | | | | |
|---|---|---|---|---|
| 2,325,548 A | * | 7/1943 | Roos et al. ................. 244/87 |
| 2,927,750 A | * | 3/1960 | Elmer ...................... 244/76 R |
| 4,012,015 A | * | 3/1977 | Nelson et al. ............. 244/220 |
| 4,559,524 A | * | 12/1985 | Suzuki ...................... 341/11 |
| 4,567,786 A | * | 2/1986 | Sakurai .................. 74/483 R |
| 4,776,543 A | * | 10/1988 | Stableford ................ 244/232 |
| 5,029,778 A | * | 7/1991 | DeLuca .................... 244/234 |
| 5,188,316 A | * | 2/1993 | Dressler et al. ........... 244/234 |
| 5,913,492 A | * | 6/1999 | Durandeau et al. ......... 244/82 |
| 5,984,241 A | * | 11/1999 | Sparks ..................... 244/224 |
| 6,276,640 B1 | * | 8/2001 | Laffisse et al. ............ 244/178 |
| 6,347,770 B1 | * | 2/2002 | Oyzerskiy et al. ......... 244/234 |
| 7,069,120 B1 | * | 6/2006 | Koenck et al. ............... 701/3 |
| 7,338,018 B2 | * | 3/2008 | Huynh et al. ............. 244/215 |
| 2007/0051847 A1 | * | 3/2007 | Quitmeyer et al. ....... 244/99.2 |
| 2009/0072083 A1 | * | 3/2009 | Hanlon et al. .............. 244/87 |
| 2009/0302172 A1 | * | 12/2009 | Suddreth et al. .......... 244/236 |
| 2010/0282899 A1 | * | 11/2010 | Heintjes ................... 244/99.5 |

FOREIGN PATENT DOCUMENTS

| | | |
|---|---|---|
| EP | 0 348 816 A2 | 6/1989 |
| EP | 429939 A1 * | 6/1991 |
| FR | 1 336 604 | 10/1962 |

* cited by examiner

*Primary Examiner* — Benjamin P Lee
*Assistant Examiner* — Joshua Freeman
(74) *Attorney, Agent, or Firm* — Scully, Scott, Murphy & Presser, P.C.

(57) ABSTRACT

An input system (2) for a landing flap control of an aircraft. In order to make the input system (2) compact, light and reliable, it is provided with a selector lever (4) mounted pivotably by a shaft unit (10) for the input of a landing flap position, and a sensor arrangement (22) being arranged at one side of the selector lever (4) and having two mutually redundant opto-electronic sensor units (24) each for detecting a position of the selector lever (4), wherein a one-piece shaft element (40) of the shaft unit (10) is passed from the selector lever (4) through the sensor units (24).

7 Claims, 3 Drawing Sheets

INPUT SYSTEM FOR A LANDING FLAP CONTROL OF AN AIRCRAFT

BACKGROUND OF THE INVENTION

1. Field of the Invention

The invention concerns an input system for a landing flap control of an aircraft.

Larger aircraft such as passenger aircraft or transport aircraft include on their aerofoils landing flaps and movable slats which can be hydraulically moved to alter the wing profile. In a landing approach the wing profile is set to be more curved so that lift is increased and the aircraft has sufficient lift, in spite of a slow landing speed. To control the movement of the landing flaps, provided in the cockpit of the aircraft is an input system for the landing flap control having a selector lever, by way of which the pilot sets the landing flap position.

2. Discussion of the Prior Art

To detect the position of the selector lever such input systems are equipped with a sensor arrangement which detects the lever position and converts it into corresponding electronic signals. They are passed to a computer which controls the movement of the landing flaps and possibly the movable slats. Various methods are known for sensor detection of the selector lever, for example the use of a potentiometer, a Hall sensor or a contactlessly operating optoelectronic unit, as is known from EP 0 429 939 A1.

SUMMARY OF THE INVENTION

An object of the present invention is to provide an input system for a landing flap control of an aircraft, which is compact and light and which operates reliably in terms of its function.

That object is attained by an input system of the kind set forth in the opening part of this specification, which in accordance with the invention includes a selector lever mounted pivotably by means of a shaft unit for the input of a landing flap position, and a sensor arrangement arranged at one side of the selector lever and having two mutually redundant optoelectronic sensor units each for detecting a position of the selector lever wherein a one-piece shaft element of the shaft unit is passed from the selector lever right through the sensor units. It is possible to dispense with a reliability-impairing intermediate connection of a shaft element to the selector lever and a shaft element in relation to the sensor units. The fact that the shaft unit is passed through the sensor units is advantageous in terms of reliable sensing of the position of the selector lever. The shaft unit can include more than one shaft element, which are securely fixed together and are rotatable about a common axis of rotation.

Arranging the sensor units, which are of a dual nature for redundancy reasons, only at one side of the selector lever, means that the sensor unit can be of a compact structure. The sensor units respectively detect the position of the selector lever, for example relative to a housing of the input system.

Optoelectronic sensor units can very precisely detect a position of the selector lever. There is no need for conversion of the movement of the selector lever by for example a transmission arrangement so that a pivotal movement of the shaft unit through for example only a small angle can be transmitted in the same form to the sensor elements so that the sensor elements or a part thereof are moved in the same fashion, that is to say they are pivoted through the same angle. In an advantageous embodiment of the invention therefore each sensor unit has a sensor element which are both secured to the shaft unit for transmission of the movement of the shaft unit in the same form to the sensor elements, wherein the sensor units are provided for sensing a position of the sensor elements. If the shaft unit is rigidly connected to the sensor element or a part thereof the movement can be transmitted in a particularly simple and reliable fashion.

Desirably the input system includes a braking means for braking a movement of the selector lever. That provides that a resistance is opposed to a force on the part of a pilot for moving the selector lever, for tactually good manual movement of the selector lever. If the braking means is arranged on the shaft element, it can be of a compact and mechanically simple and reliable nature.

Desirably in that case the sensor units are disposed between the selector lever and the braking means. In the event of a fracture of the shaft unit directly at the braking means, the function of the sensor units can remain unaffected, thereby achieving a high level of safety.

The selector lever can be continuously movable to control the landing flaps. A simpler control is achieved by means of discrete predetermined positions of the selector lever so that the selector lever is moved from one position to another and intermediate positions are prevented. In that way the landing flaps can be moved to predefined positions without the pilot having to manually implement a precise setting. To produce the discrete positions of the selector lever the input system advantageously includes a contour means having a contour, wherein the selector lever is fixedly connected to an element which is provided for a movement in the contour upon actuation of the selector lever. If the element reaches for example a recess in the contour it can remain at rest therein and retain the selector lever in the position related thereto. The contour means is desirably a contour disc with a plurality of recesses which are each associated with a respective discrete position of the selector lever.

Particularly in the case of a very large aircraft it can be necessary that the landing flaps and movable slats have to be deployed for a landing approach to permit reliable deceleration of the aircraft. If there is a defect for example in the contour means or in unlocking of the selector lever so that it cannot be moved into the position intended for same, landing can involve problems. Desirably therefore the input system includes a safety system with which the selector lever can be moved into the intended landing position even without a movement of the element in the contour means.

A particularly advantageous implementation of such a safety system is achieved by mobility of the contour means which for that purpose is desirably mounted rotatably on the shaft unit. The selector lever can be moved for example with a greater force into the position intended for the landing, in which case it is not that the element is moved in the contour means, but the entire contour means is moved into the position intended for same, for example by passing over a latching means.

If the contour means were moved on the shaft unit in an emergency situation by means of the safety system, its further use can be adversely affected by the position of the contour means, which is now different from the intended one. The movement of the contour means on the shaft unit should be reversed in order to make the input system fully functional again, as originally. In the case of aircraft which can be landed even without extended landing flaps, such a safety system is therefore not necessary so that for example it is possible to dispense with an implementation whereby the contour means passes over a latching configuration. For that purpose the input system advantageously includes a housing for mounting in a cockpit and a blocking element which is rigidly connected to the housing and which engages into a recess in the contour means. The safety function can be prevented and long-term and reliable operation of the input system without re-setting of the contour means, that involves maintenance, can be achieved.

Multiple employment of the contour means for a use both with a safety system and also for a use without a safety system can be achieved if the recess into which the blocking element engages has two recess portions which are remote from each other in the pivotal direction of the selector lever at the spacing of two adjacent positions of the selector lever, wherein the blocking element engages into one of the recess portions. In the event of replacement of the blocking element with a for example spring-mounted element, it can change over from one recess portion into the other recess portion and thus allow a defined pivotal movement of the contour means on the shaft unit, which produces a defined position for the landing flaps for a safe landing approach.

In the event of a minor defect at the input system it is advantageous if parts can already be replaced in the cockpit without the entire input system having to be dismantled and replaced by another. To replace parts a cover panel which is towards a handle of the selector lever and through which the selector lever is passed usually has to be firstly released. The cover panel can easily be removed from the selector lever if the cover panel has an open slot around a path of movement of the selector lever. The cover panel can be removed from the fixedly mounted selected lever by the selector lever being passed through the opening of the slot.

BRIEF DESCRIPTION OF THE DRAWINGS

Further advantages will be apparent from the specific description hereinafter. Embodiments by way of example of the invention are illustrated in the drawing. The drawing and the description contain numerous features in combination, which the man skilled in the art will also desirably consider individually and combine together to form meaningful further combinations.

In the drawing.

DETAILED DESCRIPTION OF THE INVENTION

Figure 1:
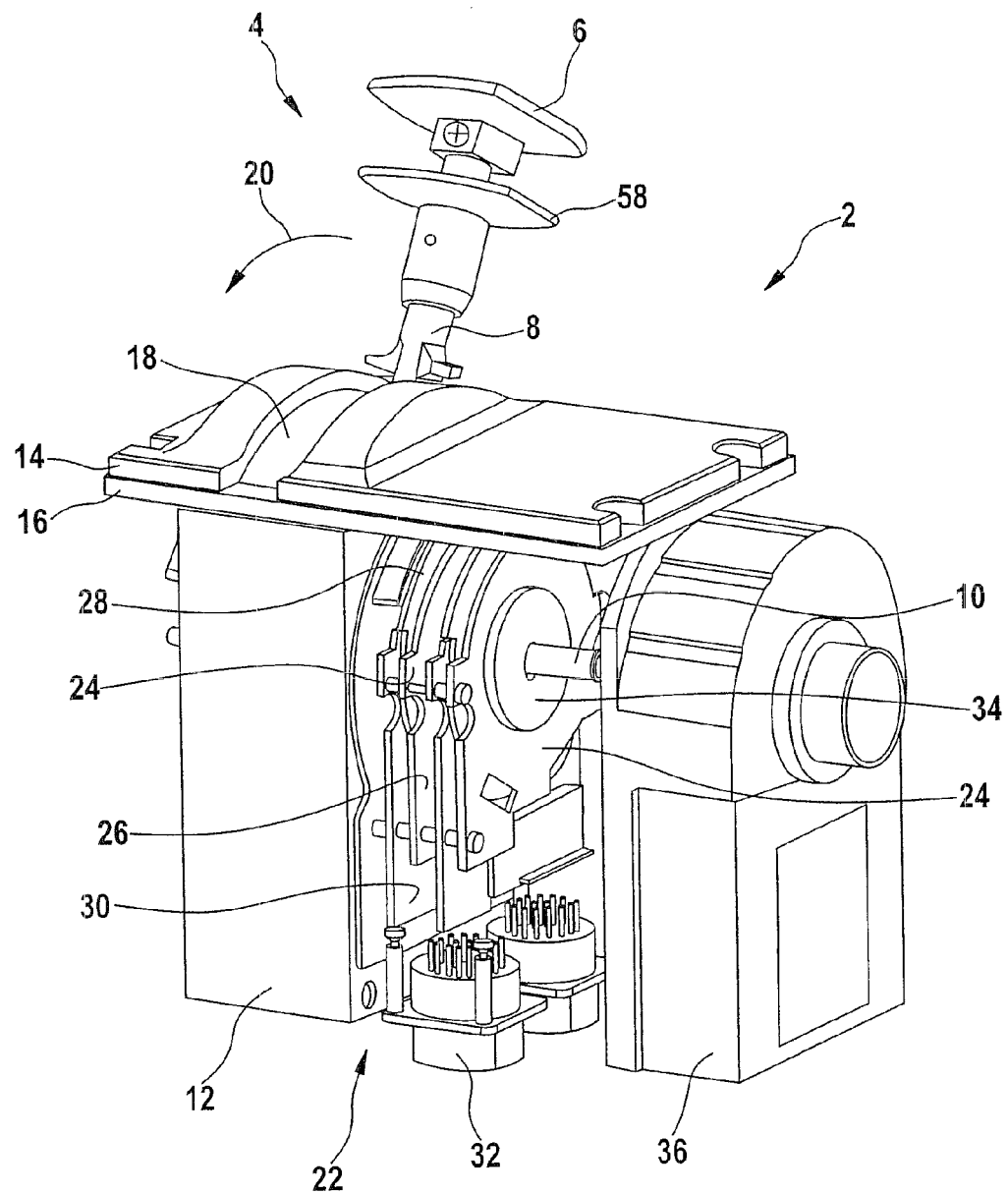
FIG. 1 shows a perspective view of an input system with a selector lever.

FIG. 1 shows an input system 2 for a landing flap control of a commercial aircraft, having a selector lever 4 with a handle 6 on a tube 8 which is mounted by a shaft element 10 pivotably in a housing 12. A housing element 36 of the housing 12 is removed by a distance, in the manner of an exploded view. The housing 12 is provided upwardly with a cover panel 14 on a safety panel 16 which are screwed in a cockpit fitting, whereby the entire input system 2 is fixedly arranged in the cockpit. The selector lever 4 can be pivoted on a path of movement through a slot 18 in the cover panel 14 about the shaft unit 10, as indicated by an arrow 20. The pivotal movement of the selector lever 8 provides that landing flaps and movable slat elements of the wings of the aircraft are moved into their positions corresponding to the position of the selector lever 4.

To control the landing flaps and slat elements, the position of the selector element 4 in the housing 12 is sensed by a sensor arrangement 22. The sensor arrangement 22 includes two sensor units 24 which are of the same structural configuration and which are arranged at one side of the selector lever 4 in mutually juxtaposed relationship and around the shaft unit 10. The sensor units 24 operate optoelectronically and contactlessly and each include an areal light source 26 by which light is radiated through sensor elements 28 in the form of a masking means on to a receiver 30. The two sensor elements 28 of the sensor units 24 are non-rotatably connected to the shaft unit 10 and are pivoted in accordance with the movement of the selector lever 4 within the sensor units 24. That also produces movement of the light pattern from the light source 26 on to the receiver 30 which registers a position of the light pattern and passes it to a control unit (not shown) by way of interfaces 32. The control unit converts the received signals into control signals for the landing flaps and movable slat elements.

Also mounted on the shaft unit 10 is a braking means 34 which opposes a force to a movement of the shaft unit 10 relative to the housing 12. For that purpose the braking means 34 is connected resiliently to the housing element 36 so that, upon a movement of the selector lever 4, a frictional movement is produced between the braking means 34 and the housing element 36—or an element mounted therebetween. Due to the frictional force, a pilot operating the selector lever experiences a mechanical resistance when moving the selector lever 4, which makes a movement of the selector lever 4 pleasant.

Figure 2:
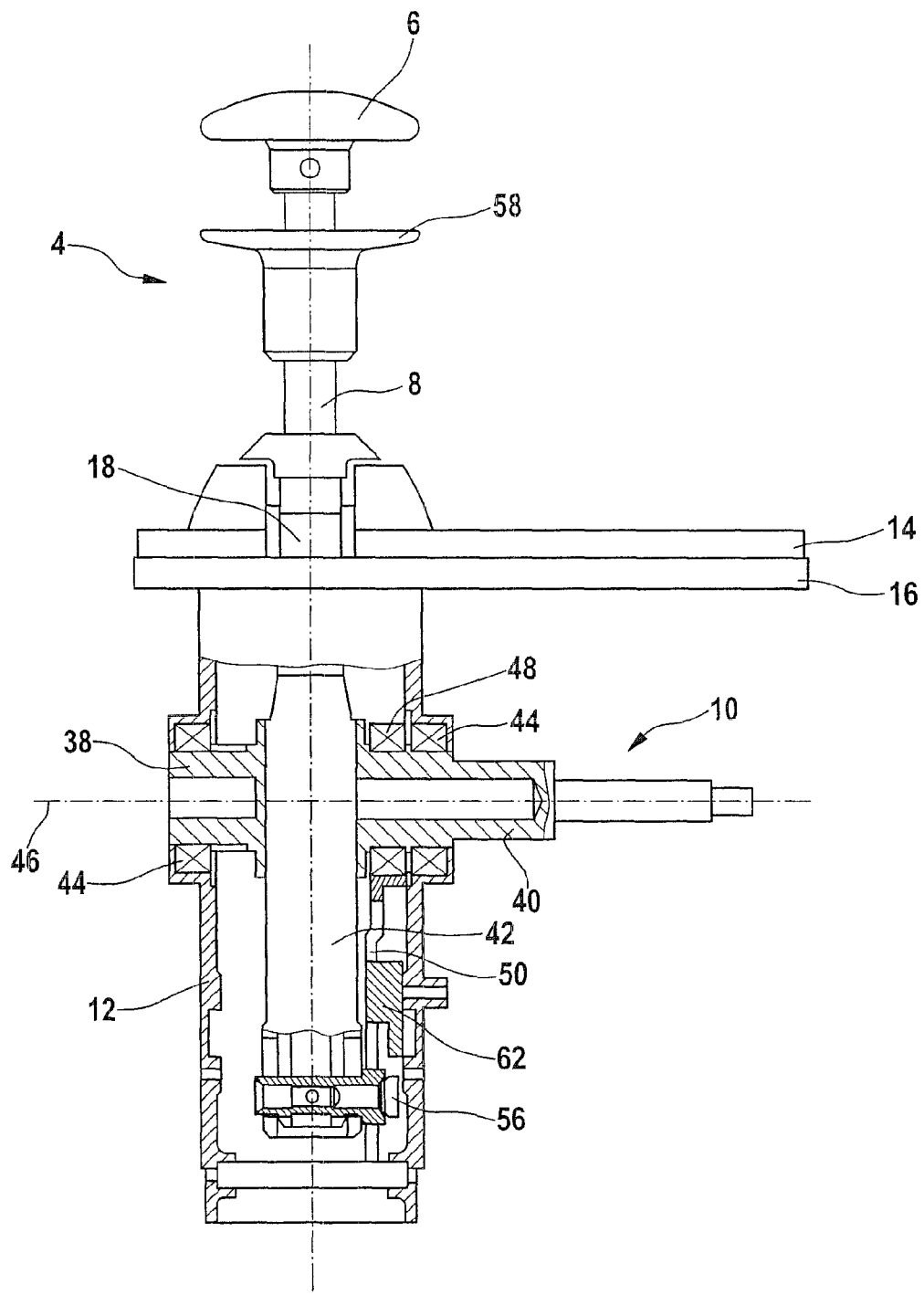
FIG. 2 shows a partly sectional side view of the input system.

FIG. 2 shows a side view of the input system 2, with the housing 12 being shown in partly sectional form in its lower region. The Figure shows the shaft unit 10 which is illustrated in section and which includes two shaft elements 38, 40 screwed to an extension 42 of the tube 8. The shaft unit 10 is mounted rotatably in the housing 12 by means of two bearings 44 so that the selector lever 4 is pivotably movable about an axis of rotation 46. A portion of larger diameter of the shaft element 40 is passed through the sensor units 24 and a portion of smaller diameter of the shaft element 40 carries the braking means 34.

A contour means 50 in the form of a contour disc is also mounted rotatably on the shaft unit 10 by means of a further bearing 48. A portion of the contour means 50 is shown from the side in FIG. 3, so that it is possible to see a contour 54 which includes five recesses 52 and which extends around a closed hole in the contour disc. Mounted in one of the recesses 52 is an element 56 in the form of a pin, which is fixedly connected to the selector lever 4 and which holds the selector lever 4 in a central position, in the position shown in FIG. 3. The element 56 is urged into the recesses 52 by a spring element (not shown).

Figure 3:
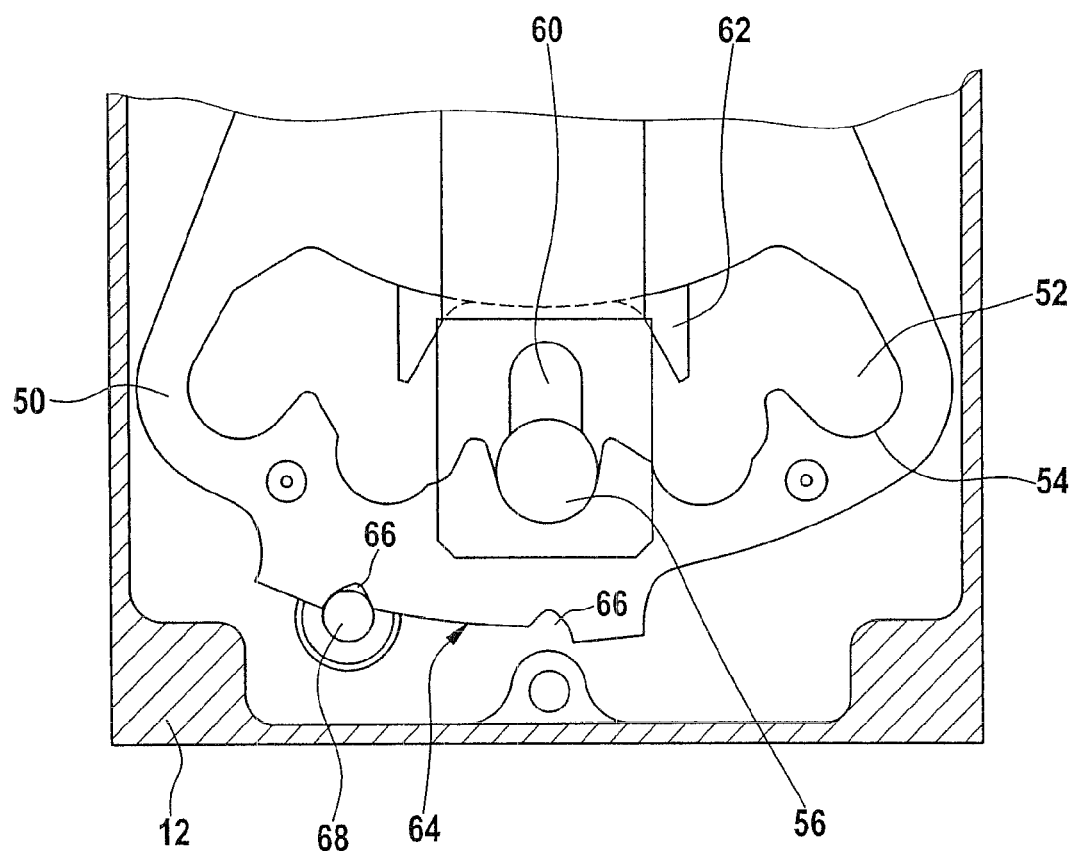
FIG. 3 shows a region of a contour disc in a housing of the input system.

By means of a release means 58 on the handle 6, the element 56 can be pulled upwardly in a slot 60 of a guide means arranged behind the contour disc in FIG. 3, and can thus be pulled out of the recess 52 so that the selector lever 4 can be moved into an adjacent position and the element 56 can be moved downwardly into the corresponding recess 52 so that the selector lever 4 remains fixedly in that position. Limiting means 62 arranged over the recesses 52 prevent the element 56 and therewith the selector lever 4 from being capable of being moved in a continuous movement from its central position into an outer position without the element 56 being introduced into a recess 52 therebetween. That can prevent overtravel of the landing flaps.

On its underside the contour means 50 is provided with an elongate recess 64 which at its two outer edges includes a respective, still deeper recess portion 66. Engaged into one of those recess portions 66 is a blocking element 68 including a pin which is mounted rigidly in the housing 12 and which engages into the recess 66. That provides that the contour means 50 which in itself is mounted rotatably on the shaft unit 10 is also fixed rigidly within the housing 12.

In the case of large aircraft it may be necessary that the landing flaps and the slats have to be extended in a landing approach and the selector lever 4 has to be pivoted into a second-outermost position. If in a flight the selector lever 4 is pivoted into an outermost position and the landing flaps and slat elements are retracted and the selector lever 4 or the element 56 or another element necessary for movement of the selector lever 4 is defective, then under some circumstances it is not possible for the selector lever 4 to be moved from the outermost position into the second-outermost position. A landing approach cannot be carried out and the aircraft is put at risk.

In order nonetheless to be able to extend the landing flaps and the movable slat elements without a movement of the element 56 in the contour 54 the entire contour 54 and therewith the contour means 50 would have to be pivoted on the shaft unit 10. That movement can be allowed if the housing 10 is somewhat larger and includes a safety system by which the blocking means 68 is not rigidly mounted in the housing but is urged in a spring-supported fashion into the recess portion 66. When a suitably high force is applied to the selector lever 4 the contour means 50 can be pressed against the blocking element 68 so strongly that it disengages against the spring force from the recess portion 66 and the contour means 50 is pivoted towards the left in a view as in FIG. 3. That overriding on the part of the selector lever 4 provides that the blocking element 68 latches in the other recess portion 66 so that the selector lever 4 is further moved. That further movement provides that the shaft unit 10 and therewith the masking means 28 are also moved so that a signal is sent to the control unit by way of the interface 32, for extension of the landing flaps and movement of the slat elements.

The recess portions 66 are arranged spaced from each other in the direction of pivotal movement of the selector lever 4 or contour means 50, at the spacing of two adjacent discrete positions, that is to say recesses 52. That provides that the selector lever 4, upon overriding thereof, is further moved by precisely one position or recess 52.

By virtue of the provision of the two recess portions 66, the contour means 50 and therewith the entire mechanism of the input system 2—apart from the blocking element 68—can be used both with a safety system for an overriding action and also without a safety system.

LIST OF REFERENCES

2 input system
4 selector lever
6 handle
8 tube
10 shaft unit
12 housing
14 cover panel
16 safety panel
18 slot
20 arrow
22 sensor arrangement
24 sensor unit
26 light source
28 masking means
30 receiver
32 interface
34 braking means
36 housing element
38 shaft element
40 shaft element
42 extension
44 bearing
46 axis of rotation
48 bearing
50 contour means
52 recess
54 contour
56 element
58 release means
60 slot
62 limiting means
64 recess
66 recess portion
68 blocking element

What is claimed is:

1. An input system for a landing flap control of an aircraft, comprising:
    a selector lever mounted pivotably by a shaft unit for the input of a landing flap position,
    a sensor arrangement arranged at one side of the selector lever and having two mutually redundant optoelectronic sensor units each for detecting a position of the selector lever, wherein a one-piece shaft element of the shaft unit is passed from the selector lever through the sensor units,
    a means for providing a contour, wherein said means is mounted on the shaft unit by a bearing enabling a rotary movement of the means on the shaft unit, and
    an element fixedly connected to the selector lever, the element being movable in the contour upon actuation of the selector lever.

2. The input system according to claim 1, wherein each said sensor unit comprises a sensor element, wherein said sensor elements are both fixed to the shaft element for transmission of the movement of the shaft element in the same form to the sensor elements, and the sensor units each sense, respectively, a position of the sensor elements.

3. The input system according to claim 1 or claim 2, wherein the shaft element carries a braking means for braking a movement of the selector lever.

4. The input system according to claim 3, wherein said sensor units are arranged between the selector lever and the braking means.

5. The input system according to claim 1, further comprising a housing for mounting in an aircraft cockpit, and a blocking element which is rigidly connected to the housing and which engages into a recess of the means for providing a contour.

6. The input system according to claim 5, wherein said recess has two recess portions which are spaced from each other in a direction of pivotal movement of the selector lever at a spacing of two adjacent discrete positions of the selector lever, wherein the blocking element engages into one of the recess portions.

7. The input system according to claim 1, further comprising a cover panel facing towards a handle of the selector lever and having an open slot extending around a path of movement of the selector lever.

* * * * *